United States Patent [19]

Potter

[11] Patent Number: 4,506,565
[45] Date of Patent: Mar. 26, 1985

[54] CHAIN SAW AUTOMATIC SHARPENING METHOD AND ASSEMBLY

[75] Inventor: E. L. Potter, Charlotte, N.C.
[73] Assignee: Textron, Inc., Providence, R.I.
[21] Appl. No.: 402,915
[22] Filed: Jul. 29, 1982
[51] Int. Cl.³ .............................................. B23D 63/16
[52] U.S. Cl. ..................................... 76/25 A; 76/112; 30/139
[58] Field of Search .......................... 76/25 A, 37, 112; 30/138, 139; 51/246; 83/174, 174.1

[56] References Cited

U.S. PATENT DOCUMENTS

| | | |
|---|---|---|
| 3,138,973 | 6/1964 | Muir ........................................ 76/37 |
| 3,260,287 | 7/1966 | Oehrli . |
| 3,465,617 | 9/1969 | Silvon . |
| 3,465,795 | 9/1969 | Tupper . |
| 3,487,591 | 1/1970 | Silvon . |
| 4,062,253 | 12/1977 | Dilworth . |

Primary Examiner—Roscoe V. Parker
Attorney, Agent, or Firm—Cushman, Darby & Cushman

[57] ABSTRACT

A mechanical drive assembly that is particularly useful for moving a sharpening stone into engagement with a sharpenable chain saw is mounted to the side plate of the chain saw housing. The stone moves linearly a predetermined stroke length toward and away from the chain, and the beginning position thereof is incrementally adjustable, to take into account wear of the stone. The stone may be returned to an original position, for replacement, in another distinct mode of operation.

22 Claims, 10 Drawing Figures

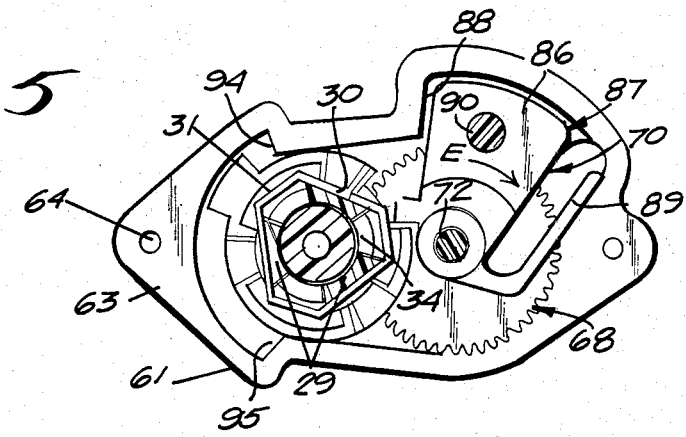
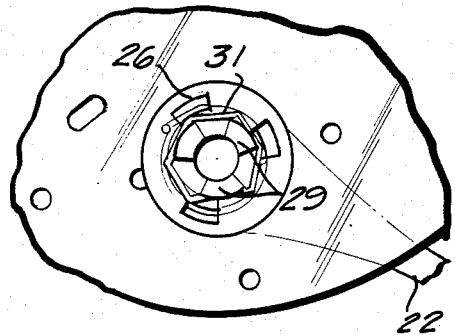
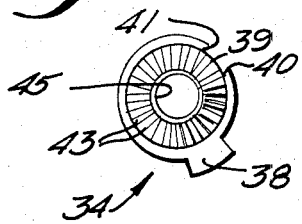
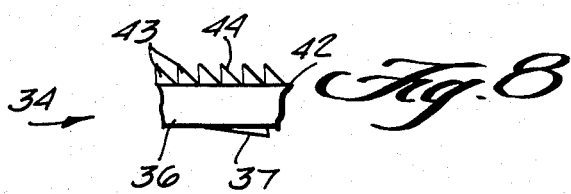
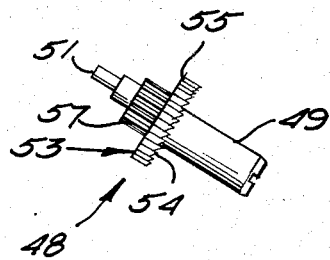
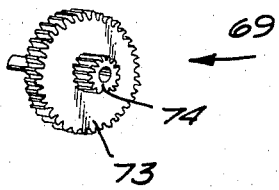

CHAIN SAW AUTOMATIC SHARPENING METHOD AND ASSEMBLY

BACKGROUND AND SUMMARY OF THE INVENTION

The invention relates to the automatic sharpening of saw chains by the average user of the saw chain, while the chain is mounted on the saw sprocket and chain bar. For many chain saw models, especially those directed to the non-professional market, it is desirable to provide for automatic sharpening of the chains by the user without removing the chain from the saw. This is commonly provided by moving a sharpening stone or like element into contact with top-sharpenable cutter teeth of the chain while the chain is being driven by a normal operation of the saw.

While a number of prior systems have been provided which are capable of effecting automatic chain sharpening, there have been a number of drawbacks associated with prior art systems. Commonly, the mounting arrangement for such structures in order to provide the proper operational movement of the stone into contact with the chain have been relatively complex. Additionally, fine control of the movement of the stone into contact with the chain, with appropriate limiting of the extent of movement, has not been provided, resulting in undue wear to the stone and chain. Additionally, any adjustments to be made in the initial position of the stone have conventionally been continuous adjustments, making it easier to move the stone too far, again resulting in undue wear to the components, and possibly even interfering with chain operation. This is especially so since the market to which automatic saw chain sharpeners are primarily directed is, as mentioned above, the non-professional market.

According to the present invention, problems associated with conventional automatic saw chain sharpeners have been overcome, and a chain saw chain sharpener is provided that allows a controlled, repeatable, and accurate sharpening of a saw chain. The sharpener mechanism is mounted in a readily accessible, convenient manner, the sharpening stone is moved into contact with the saw chain by a (predetermined length) stroke rotary lever, adjustment of the initial position of the stone to accommodate wear is incremental, and a mode of operation is provided for returning the stone mounting structure to an original position to allow replacement of the stone after the original stone has been worn down. In general, simple and effective saw chain sharpening is provided by practicing the invention.

According to one aspect of the invention, in combination with a chain saw having a powered sharpenable chain, a chain sharpener assembly is provided. The assembly includes a sharpening stone, and means for effecting linear movement of the stone a predetermined stroke length toward and away from the chain to be sharpened so that in a first position thereof the stone is spaced from the chain, and in a second position thereof the stone operatively engages the chain. Also means for effecting incremental adjustment of the spacing of a chain-distal portion of the stone from the chain in the first position are provided.

The means for effecting linear movement of the stone effect movement in first and second opposite linear directions, toward and away from the chain, respectively. The movement effecting means comprise means for effecting movement of the stone in a first mode of operation in both the first and second directions; means for effecting movement of the stone in a second mode of operation in only the first direction; and means for effecting movement of the stone in a third mode of operation in the second direction, the modes being entirely distinct from each other. For instance by grasping the operating lever and rotating it initially in one direction, the operator moves the stone toward the chain for sharpening. By axially depressing the operating lever, and initially moving it in a second direction, opposite the first direction of rotation, and then returning the operating lever to its initial position, the operator effects an incremental adjustment of the stone toward the chain. By not using the operating lever at all, but rather by manually defeating a pawl mechanism and by using a screwdriver to rotate a central shaft coaxial with the lever, the stone can be returned to an original position.

The invention also includes a chain saw having a drive sprocket contained by a housing, a chain bar extending outwardly from the housing and disposed in a predetermined plane, and a sharpenable saw chain driven by the sprocket around the chain bar. The housing includes a side wall thereof disposed in a plane substantially parallel to the chain bar, and a sharpener assembly is mounted by the side wall and includes a sharpening stone mounted interiorly of the housing and adjacent the sprocket. The stone is mounted for reciprocal movement, and an operating lever extends outwardly from the housing and is mounted exteriorly of the housing for engagement by an operator to effect movement of the stone. The operating lever is rotatable about an axis of rotation perpendicular to the side wall, and it extends upwardly from the housing and has a distal portion that does not overlap the housing at any time during movement of the operating lever.

The invention also comprises the particular mechanical drive assembly components utilizable in the saw chain sharpener, and method of operation thereof. The components are small and very compactly arranged, yet provide three different modes of operation in an effective manner.

It is the primary object of the present invention to provide a simple and effective chain saw chain sharpener which provides a controlled, repeatable, and accurate sharpening of the saw chain. This and other objects of the invention will become clear from an inspection of the detailed description of the invention, and from the appended claims.

BRIEF DESCRIPTION OF THE DRAWINGS

FIG. 5 is a cross-sectional view of the sharpener taken along lines 5—5 of FIG. 4;

FIG. 6 is a detail perspective view showing the particular nature of the drive components of the operating handle of the sharpener;

FIG. 7 is a bottom plan view of the drive ring of the sharpener;

FIG. 8 is a detail side view of a portion of the drive ring of FIG. 7;

FIG. 9 is a rear perspective view of the ratchet gear component of the sharpener; and FIG. 10 is a rear perspective view of the drive gear component of the sharpener.

DETAILED DESCRIPTION OF THE DRAWINGS

Figure 1:
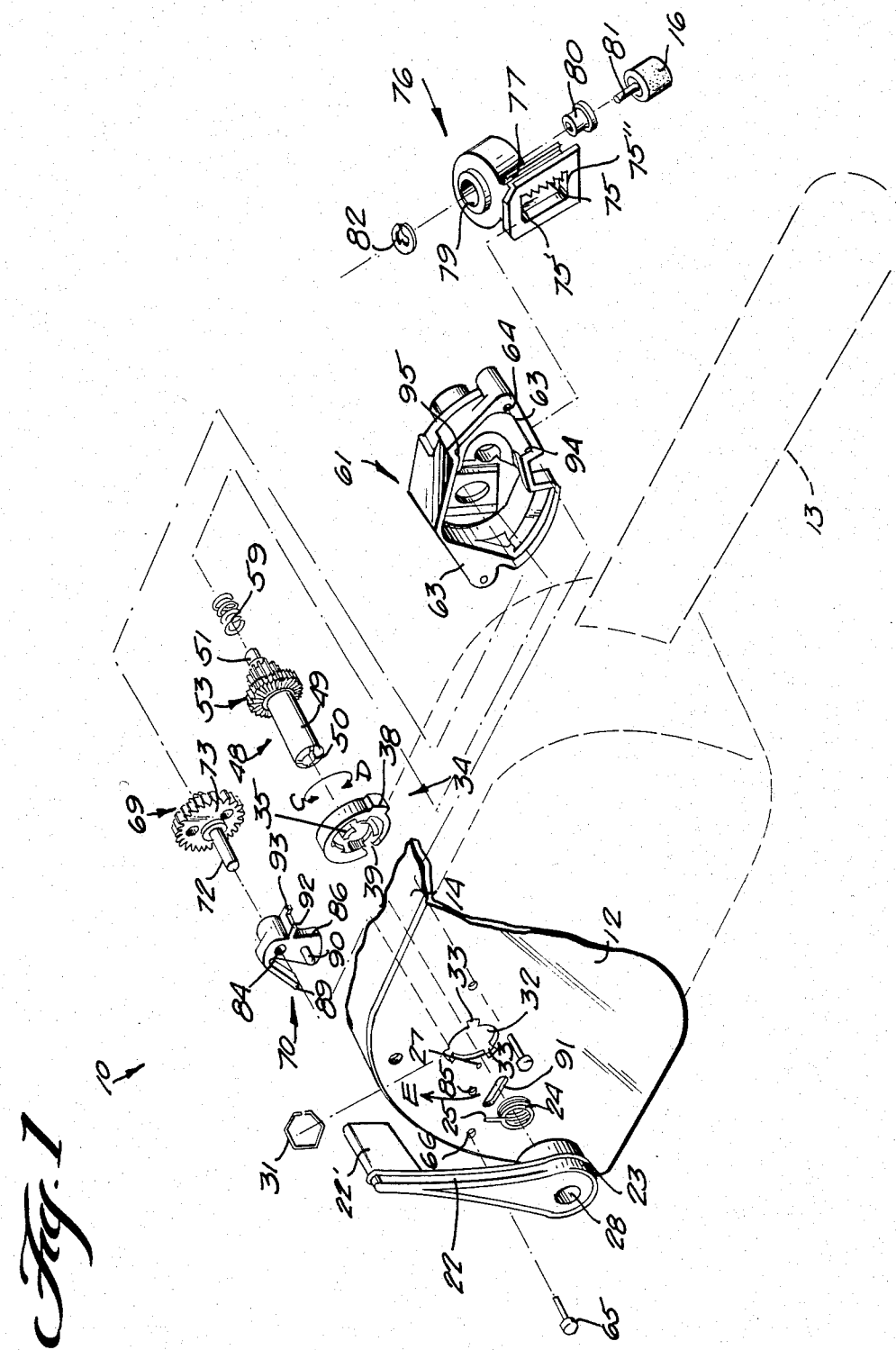
FIG. 1 is an exploded perspective view of an exemplary automatic chain saw sharpener according to the present invention.

An exemplary automatic saw chain sharpener according to the present invention is shown generally by reference numeral 10 in the drawings. The sharpener assembly 10 is mounted so that it is attached to the side plate 12 of the sprocket cover of a saw chain. The side plate 12 is parallel to the chain bar (shown in dotted line at 13 in FIG. 1) of the chain saw, and adjacent the top 14, and rear 15, of the sprocket cover. A portion of the sharpener 10 is mounted outside the side plate 12, while the actual sharpening stone 16 and other components are mounted inside the plate 12.

The sharpening mechanism 10 according to the present invention is capable of operation in three different modes. The first mode of operation is the reciprocation of the stone 16 in direction A (see FIG. 2) to go into operative contact with the cutter links 18 of a saw chain 19 being driven by a sprocket 20 to effect sharpening of cutting portions of the links 18, and reciprocation in direction B (opposite direction A) to move away from the saw chain 19 into a rest, non-sharpening position. The second mode of operation is the incremental advancement of the stone 16 in direction A (only) to accommodate wearing of the stone 16. The third mode of operation is a continuous movement of the stone 16 in direction B to an initial position at which a new stone 16 is normally provided for the sharpener 10.

The individual components of the sharpener 10 according to the invention will now be described, and their operative interrelationships set forth.

Mounted exteriorly of the side plate 12 is the operating handle 22, which can best be seen in FIGS. 1, and 3 through 6. The distal end 22' of the lever 22 is actually engaged by the operator, and at all times extends upwardly of the walls 12, 14, and never overlaps the sprocket cover, always being readily accessible. The lever 22 includes a hub portion 23 which receives a combined torsion and compression spring 24, a first end 25 of the spring 24 anchored within the interior of the hub 23, and a second end portion 26 extending through opening 27 formed inside plate 12. A central bore 28 is provided in the hub 23, the bore 28 being aligned with the axis of rotation of the handle 22 during use.

On the interior side of the hub 23 a plurality (e.g. three) of drive tabs 29 are provided, extending outwardly from hub 23 parallel to the bore 28. Cut out portions 30 (see FIG. 5) are provided along the exterior periphery of the tabs 29 for receipt of a wire retaining clip 31. An opening 32 is provided in the side plate 12 for alignment with bore 28, the opening 32 having dimensions large enough so that the tabs 29 may pass therethrough. Once the tabs pass through the opening 32, the retaining clip 31 is moved into operative association with the cut outs 30, and the clip 31 prevents the tabs 29 from being withdrawn from the interior of the sprocket cover. Formed with the opening 32 are a plurality of detent openings 33.

The drive tabs 29 are adapted to cooperate with driven tabs 35 (e.g. three such tabs) of a drive ring 34, which tabs 35 engage side portions of the drive tabs 29. The drive and driven tabs 29, 35 both preferably comprise annular portions with cooperating shapes, as seen most clearly in FIG. 5. The drive ring 34 is most clearly seen in FIGS. 1, 4, 7 and 8.

The drive ring 34 has a top surface 36 (see FIG. 8 in particular) from which a plurality of detent ramps (e.g. three) 37 extend. The detent ramps 37 are adapted to cooperate with the detent openings 33 in the side plate 12. Extending radially outwardly from the drive ring body is a stop tab 38. A pawl-receiving recess 39, including leading and trailing edges 40, 41, thereof, is formed in the periphery of the drive ring 34 spaced from the stop tab 38.

On the bottom face 42 of the drive ring 34, opposite top face 36, a plurality of ratchet teeth 43 are provided. The ratchet teeth 43 are shaped as illustrated in FIG. 8, having a sloped edge 44. A central bore 45 extends through the center of the drive ring 34.

A ratchet gear component 48 cooperates with the drive ring 34 and handle 22. The ratchet gear component 48 is seen most clearly in FIGS. 1, 4, and 9, and includes a shaft 49 which is adapted to be received by the bore 45 in drive ring 34 and the bore 28 in handle 22. Notches 50 are formed in the end of shaft 49 received by the bore 28 for receipt of a screwdriver blade. The end 51 of shaft 49 is opposite the notches 50, and has a reduced diameter.

Integral with a central portion of the shaft 49 is a ratchet gear component shown generally by reference numeral 53. The ratchet gear component includes a top surface from which a plurality of slanted teeth 54 extend. The teeth 54 have basically the same configuration as the teeth 43 of the drive ring 34, and cooperate therewith. Because of the slanted nature of the cooperating teeth 43, 54, a ratcheting action may exist therebetween—i.e. they always mesh for driving in one direction of rotation, but can slip with respect to each other in the other direction of rotation. The ratchet gear 53 also includes ratchet teeth 55 formed on the perimeter thereof, the teeth 55 also being slanted in the same manner as the teeth 43, 54. The teeth 55 are adapted to cooperate with a pawl, to be hereafter described.

The ratchet gear component 48 also includes an integral first gear 57 formed directly below ratchet gear 53. The first gear 57 is a conventional spur gear with involute gear teeth. The spur gear 57 diameter is substantially less than the ratchet gear 53 diameter.

A compression spring 59 is adapted to receive the end 51 of shaft 49, and abut the bottom of the spur gear 57 to provide a biasing force to the component 48 along the direction of elongation of the shaft 49. See FIGS. 1 and 4. The compression spring 59 is adapted to be received within a recess 60 within the sharpener housing 61, while the reduced diameter end 51 of the shaft 49 passes through a bore 62 in the housing 61, which bore 62 mounts the shaft 49 for rotation.

The spring 59 provides the force for biasing the detent ramps 37 into engagement with the side plate 12 (and openings 33 therein), and additionally provides a force maintaining the teeth 43, 54 in engagement. Only when a force applied on lever 22 rotating it in direction D (see FIG. 1) is greater than the force provided by the spring biasing of spring 59 will relative movement between the teeth 54, 43 occur.

The housing 61 is adapted to receive or mount all of the components of the sharpener 10 interior of the side plate 12. The housing 61 preferably is mounted to the side plate 12 utilizing a pair of ears 63 each of which has an opening 64 formed therein for receipt of a rivet-type screw 65 (see FIGS. 1 and 4) which passes through an opening 66 in side plate 12.

Figure 4:
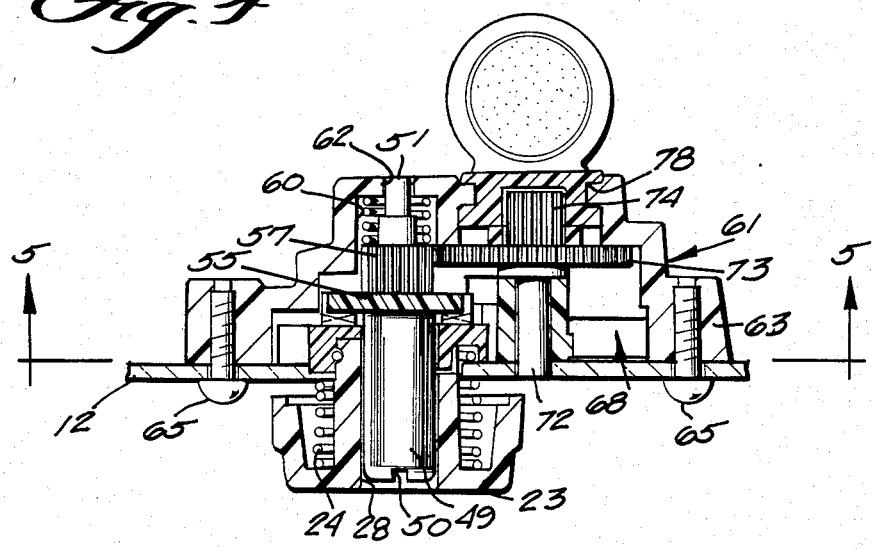
FIG. 4 is a cross-sectional view of the assembled sharpener taken along lines 4—4 of FIG. 2.

Mounted within an interior cavity 68 (see FIG. 4) of the housing 61 is a drive gear component 69 for cooperation with the spur gear 57 of the component 48, and a pawl assembly 70 for cooperation with the ratchet gear 53 and drive ring 34. The drive gear 69, which is best seen in FIGS. 1, 4, and 10, comprises a shaft 72 with a first large spur gear 73 formed integrally therewith, and a smaller pinion gear 74 disposed below the large gear 73. The gear 73 has involute gear teeth adapted to cooperate with the teeth of gear 57, and the gear 74 includes involute gear teeth adapted to cooperate with rack 75 of sharpening stone housing 76. Stops 75', 75" (see FIG. 1) cooperate with gear 74 to prevent overtravel of the stone housing 76 within its guiding slide surfaces 77.

The sharpening stone housing 76 is mounted to the exterior of the housing 61, and is guided for reciprocation in directions A and B by cooperating linear channels 77 formed in the housing 76 parallel to the rack 75, and tab 78 formed on housing 61 disposed in channel 77.

Figure 2:
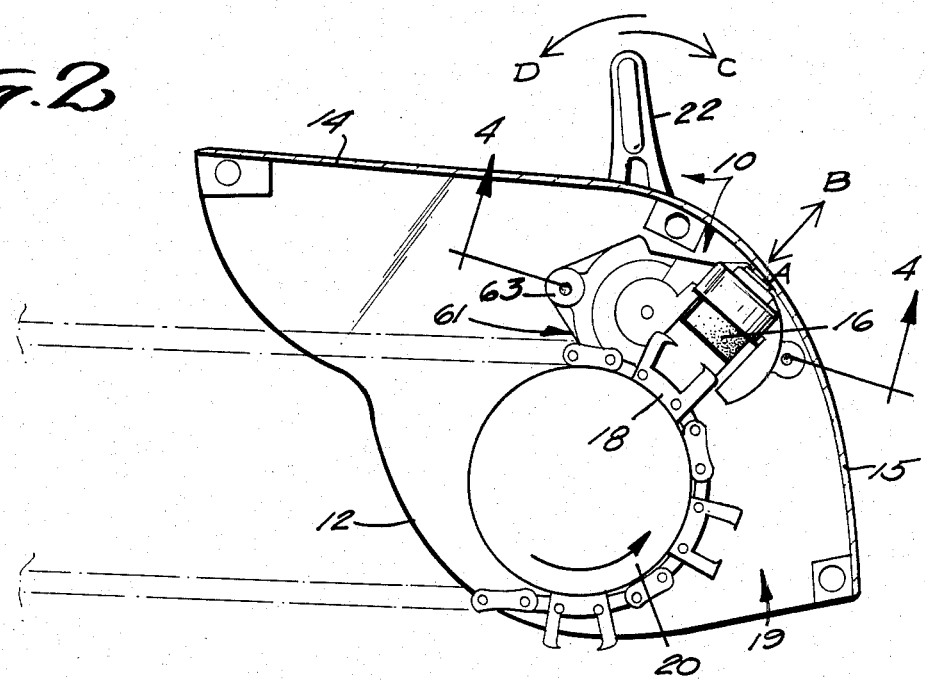
FIG. 2 is an elevational view from the interior of the chain saw with which the exemplary sharpener according to the present invention is associated, illustrating the sharpener in operative association with a chain to be sharpened.
Figure 3:
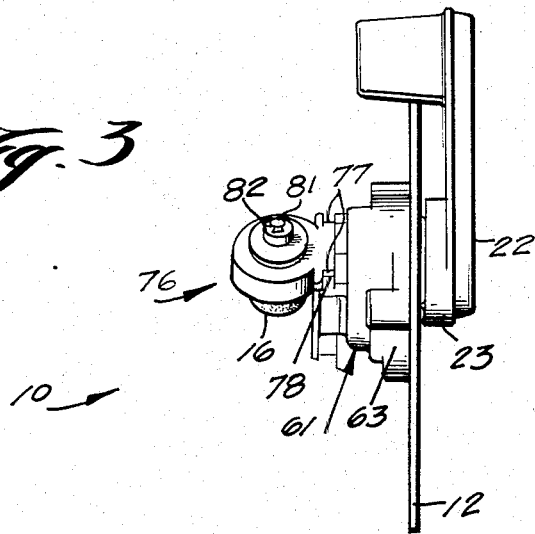
FIG. 3 is a rear view of the exemplary sharpener of FIG. 1, when assembled with the chain saw side plate.

As seen most clearly in FIGS. 1 through 3, the stone housing 76 includes a central bore 79 therein parallel to the channels 77 for receipt of the flange bushing 80 and shaft 81 of cylindrical sharpening stone 16. A retaining ring 82 engages the tip of shaft 81 after it passes through the bore 79, and holds the stone 16 to the housing 76. The stone 16 is freely rotatable about an axis defined by shaft 81, with respect to housing 76.

The pawl component 70 includes a central bore 84 adapted to receive shaft 72, and after passing through bore 84 the shaft 72 is received in an opening 85 formed in side plate 12, as seen most clearly in FIG. 4. Bore 84 loosely receives the shaft 72 so that the components 70, 69 are freely rotatably with respect to each other.

A body portion 86 of pawl component 70 is received within a portion 87 of the cavity 68 of housing 61, and cooperates with side wall 88 of housing 61 to limit rotational movement of component 70. A resilient spring biasing finger 89 is formed integral with body 86 to normally bias the body 86 against wall 88. A post 90 extends upwardly from body 86 parallel to bore 84 and passes through arcuate opening 91 in side plate 12 to allow an operator to effect manual movement of the pawl component 70 against the bias spring finger 89. The pawl component 70 also includes first and second pawls 92, 93. The first pawl 92 is received within clearance opening 39 of drive ring 34, opening 39 allowing rotation of the drive ring 34 to the full extent of the stop tab 38 against housing stop 94 (see FIG. 5). The trailing edge 41 of drive ring 34 can engage first pawl 92 to cam it out of the way (against the bias of spring finger 89) in another direction of rotation. The second pawl 93 is adapted to cooperate with the ratchet teeth 55 of the ratchet component 48 to allow incremental rotation of the component 48 in one direction, but not the other, when pawl 93 and ratchet teeth 55 are in operative association with each other.

OPERATION

There are three distinct modes of operation of the structure according to the invention: (1) the normal sharpening movement during which the grinding stone 16 is brought into and out of contact with the cutter length 18 of the moving saw chain 19; (2) the incremental adjustment movement of the grinding stone 16 in direction A to take into account wear to the stone 16; and (3) return of the entire mounting structure 76 for the stone 16 to an original position whereat a new stone 16 may be substituted for a worn out stone. According to the invention, the same stroke length of the stone 16 during operation (1) exists no matter what the wear condition of the stone 16 is. Also, in view of the incremental nature of the stone adjustment movement (2), there is no tendency for too much of an adjustment to the stone to be made, which would result in excessive wear on the stone, and perhaps even interference between the stone and the chain 19 during normal operations.

Operation (1) is accomplished as follows: with the lever handle 22 and the stone 16 in the position illustrated in FIGS. 2 and 3, the operator, when wishing to effect sharpening action of the chain 19 as the chain is being driven by sprocket 20, pulls back on lever portion 22 in the direction of arrow C in FIG. 2. The hub 23 rotates against the bias of spring 24 as a result of this movement, and the tabs 29 which engage the tabs 35 of drive ring 34 cause the drive ring 34 to be rotated in the direction C (see FIG. 1). This rotation continues until stop projection 38 of drive ring 34 engages a cooperating stationary stop 95 of housing 61. During this movement the teeth 43 of drive ring 34 engage the upper surface ratchet teeth 54 of the ratchet gear assembly 48, causing assembly 48 to also rotate in direction C. Spring 59 biases the teeth 43, 54 together. This rotation of ratchet gear member 54 causes spur gear portion 57 thereof to engage the large spur gear 73 of the driving gear component 69, causing pinion gear 74 thereof to rotate while engaging rack 75, and causing the entire grinding stone housing 76 to reciprocate in direction A (see FIG. 2), with the stone 16 coming into contact with cutting links 18 of chain 19. The relative dimensions of the gears 57, 73, 74 provide a gear-reduction action, the stone 16 actually moving only a very small linear distance in direction A.

During rotation of the drive ring 34 in direction C, the trailing edge 41 of cut out 39 thereon engages upper pawl component 92 of the pawl mechanism 70, moving the pawl out of the way, against the bias of spring finger 89. Once the lever 22 is released, it returns to its original position (FIG. 2), rotating in direction of arrow D in FIG. 2, under the influence of the torsion spring 24. Once the drive ring 34 rotates in this position to where the trailing edge 41 is no longer engaging pawl 92, pawl 93 under the influence of the biasing finger 89 moves into engagement with the peripheral ratchet teeth 55 of the ratchet gear 53. Engagement between detent ramps 37 and opening 33 prevent further movement of the lever 22 in direction D.

Operating mode (2) is as follows: after there has been some wear of the stone 16, in order to maintain the proper sharpening action since the stroke length of the stone 16 is constant, the position of the entire housing 76 is advanced slightly in the dimension A. This advancing action is accomplished by pushing down on hub 23 of lever handle 22, causing the springs 24, 59 to be slightly compressed and moving the detents 37 of drive ring 34 out of engagement with the detent openings 33 in the side plate 12. The detents therefore no longer prevent rotation of the lever 22 from the FIG. 2 position in the direction D. The operator then rotates the lever 22 in the direction D until the stop component 38 from drive ring 34 engages stationary stop 94 of housing 61. Because of the relative shapes of the teeth 43, 54 of the drive ring 34 and ratchet gear assembly 38, respectively—and the relative shapes of the ratchet teeth 55 and pawl 93—movement of the drive ring 34 in the direction D does not result in movement of the ratchet gear assembly 48. However, upon return of the lever 22 to its original position under the bias of spring 24, the teeth 43, 54 will engage and ratchet gear 53 will rotate in direction C an arcuate distance corresponding to a predetermined number (preferably 1) of the peripheral ratchet teeth 55. During this movement the pawls 92, 93 are continuously biased by spring finger 89 toward the gear 53 and the drive ring 34, but because of the shape of the teeth 55 they will cam the pawl 93 out of the way during this movement. However once a tooth 55 is past the pawl 93, it cannot return in the direction D, the pawl 93 positively preventing that.

The advancement by a predetermined number of teeth 55 (e.g. 1) of the ratchet gear 53 results in a corresponding small linear advancement in direction A of the stone 16 through the interengagement between the gears 57, 73, 74, etcetera. When the lever 22 returns to its original position and the depressing force is released, with the detents 37 moving back into openings 33, the entire sharpening structure is in exactly the same position as before the stone adjustment action except that the stone 16 has been moved a very small amount in direction A. The length of the sharpening stroke during the next sharpening operation of the lever 22 is the same as before.

Operating mode (3) is as follows: after the stone 16 has been worn down substantially, and a new stone needs to be inserted, it is necessary to move the entire stone retaining housing 76 in the direction B back to an original position, otherwise a new stone 16 would block or interfere with the rotation of the chain 19. This is accomplished by the operator grabbing upstanding post 90 of pawl member 70 and moving it in direction E (see FIGS. 1 and 5) against the bias of spring finger 89, to move the pawl members 92, 93 out of engagement with the drive ring 34 and ratchet gear assembly 48. With the pawl member 70 held in its position, the operator inserts a screwdriver through bore 28 into operative engagement with slots 50 in shaft 49, pressing axially on shaft 49 to disengage the ratchet teeth 43 and 54 while drive ring 34 is prevented from axial motion by shoulder 94 in housing 61, and rotating the shaft in direction D which—through gears 53, 73, and 74—causes the stone housing 76 to reciprocate in direction B. Once the housing 76 is back in its original position, the screwdriver is removed from engagement with the shaft slots 50, and the post 90 is released.

It will thus be seen that according to the present invention a simple and effective automatic sharpening mechanism for a chain saw has been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. In a combination with a chain saw having a powered sharpenable chain, a chain sharpener assembly comprising:
   a sharpening stone; and
   means for effecting linear movement of said stone a predetermined stroke length toward and away from the chain to be sharpened so that in a first position thereof the stone is spaced from the chain, and in a second position thereof the stone operatively engages the chain; and for effecting incremental adjustment of the spacing of a chain-distal portion of said stone from the chain in said first position.

2. An assembly as recited in claim 1 wherein said stone is mounted in a stone housing, and is rotatable with respect to said stone housing; and wherein said means for effecting linear movement of said stone includes a rack formed on said stone housing, and means for guiding said stone housing during linear movement thereof, said guiding being parallel to the direction of elongation of said rack.

3. An assembly as recited in claim 2 further comprising a stationary housing mounting said stone housing for reciprocal movement, and wherein said means for effecting linear movement of said stone comprises, within said stationary housing: a pinion gear engageable with said rack; a ratchet gear assembly for driving said pinion gear; a spring biased pawl assembly mounted for engagement with said ratchet gear assembly; and a drive ring mounted for engagement with said pawl assembly to move said pawl assembly against its spring bias out of engagement with said ratchet gear assembly, and for engaging said ratchet gear assembly.

4. An assembly as recited in claim 3 wherein said drive ring has a plurality of ratchet teeth formed on a first face thereof, cooperating with a set of ratchet teeth formed on an annular face of a ratchet gear of said ratchet gear assembly; and wherein said ratchet gear assembly also includes a plurality of ratchet teeth formed on a peripheral surface of said ratchet gear, said peripheral surface ratchet teeth cooperating with said pawl; and wherein said pinion is driven by said ratchet gear assembly by cooperating spur gears, one spur gear mounted on said ratchet gear assembly for rotation with said ratchet gear, and another spur gear mounted on a common shaft with said pinion for rotation therewith; and wherein said pawl is mounted for pivotal movement about said common shaft for said pinion and spur gears.

5. An assembly as recited in claim 4 wherein said drive ring includes a plurality of ramped detents and a plurality of tabs extending outwardly from a face thereof opposite said face having said ratchet teeth; and further comprising an operating lever having tab members extending therefrom into engagement with said drive ring tab members; and spring biasing means for biasing said drive ring ratchet teeth into operative engagement with cooperating ratchet teeth and said ratchet gear assembly, and for biasing said ramped detents into engagement with detent openings formed in a wall component through which said operating lever tabs pass.

6. An assembly as recited in claim 5 further comprising spring means for biasing said operating lever toward a first position in which said detent ramps engage said detent openings, and for allowing reciprocal movement of said operating lever along its axis of rotation.

7. An assembly as recited in claim 1 wherein said means for effecting linear movement of said stone comprises an operating lever mounted for rotation about an axis perpendicular to a plane containing the dimension of linear movement of said stone.

8. An assembly as recited in claim 1 further comprising means for effecting continuous adjustment of the spacing of a chain-distal portion of said stone from the chain in said first position, said means being operable by an entirely different mode of operation than said means for effecting incremental adjustment of the spacing of a chain-distal portion of said stone from the chain in said first position.

9. An assembly as recited in claim 7 wherein said means for effecting linear movement of said stone comprises means operable in response to initial rotation of said lever in a first direction for moving said stone said predetermined stroke length; and means responsive to reciprocal movement of said lever along its axis of rotation, and then initial rotational movement thereof in a direction opposite said first direction of rotational movement thereof.

10. In a combination with a chain saw having a powered sharpenable chain, a chain sharpener assembly comprising:
a sharpening stone;
means for effecting linear movement of said stone in first and second opposite linear directions, toward and away from the chain, respectively, said movement effecting means comprising: means for effecting movement of said stone in a first mode of operation in both said first and second directions; means for effecting movement of said stone in a second mode of operation in only said first direction; and means for effecting movement of said stone in a third mode of operation in said second direction; said modes of operation being entirely distinct from each other.

11. An assembly as recited in claim 10 wherein said movement in said second mode is incremental, and wherein said movement in said third mode is continuous.

12. An assembly as recited in claims 10 or 11 wherein said movement in said first mode is a predetermined constant stroke length.

13. An assembly as recited in claim 10 wherein means for effecting movement of said stone comprises an operating lever operatively engaging a shaft defining an axis of rotation of said operating lever; and wherein said first mode of operation comprises effecting rotational movement, and only rotational movement, of said lever initially in a first direction about said axis.

14. An assembly as recited in claim 13 wherein said second mode of operation of said means for effecting movement of said stone comprises linear movement of said lever along said axis of rotation, and initial rotational movement thereof in a second direction, opposite of said first direction.

15. An assembly as recited in claim 14 wherein said third mode of operation of said means for effecting linear movement of said stone comprises screwdriver blade-receiving slots formed in said shaft defining the axis of rotation of said lever, said shaft being rotatable independent of said lever by a screwdriver engaging said slots.

16. A chain saw including: a drive sprocket contained by a housing, a chain bar extending outwardly from said housing and disposed in a predetermined plane, and a sharpenable saw chain driven by said sprocket around said chain bar; said housing including a side wall thereof disposed in a plane substantially parallel to said chain bar; a sharpener assembly mounted by said side wall and including a sharpening stone mounted interiorly of said housing and adjacent said sprocket; means for mounting said stone for linear reciprocal movement and for effecting movement, from a first position spaced from said saw chain to a second position operatively engaging said saw chain for effecting sharpening thereof; and an operating lever extending outwardly from said housing and mounted exteriorly of said housing for engagement by an operator to cooperate with said means for effecting stone movement to effect movement of said stone from the first to the second position thereof.

17. A chain saw as recited in claim 16 wherein said operating lever is rotatable about an axis of rotation perpendicular to said side wall.

18. A chain saw as recited in claims 16 or 17 wherein said operating lever extends upwardly from said housing and has a distal portion thereof that does not overlap the housing at any time during its movement.

19. A chain saw as recited in claim 18 wherein said means for effecting linear reciprocal movement of said stone comprises means for effecting movement of said stone a predetermined stroke length toward and away from the chain to be sharpened, and for effecting incremental adjustment of the spacing of a chain-distal portion of said stone from the chain in said first position.

20. A chain saw as recited in claim 19 wherein said means for effecting linear reciprocal movement of said stone further comprises means for effecting continuous movement of said stone away from the chain.

21. A method of operating a chain sharpening assembly mounted with a chain saw for movement of a sharpening stone toward and away from a powered sharpenable chain in first and second opposite linear directions, respectively; said method comprising the steps of:
moving the stone in a first mode of operation continuously in both the first and second directions to effect movement of the stone into and out of engagement with the chain;
in a second mode of operation, periodically effecting movement of the stone incrementally only in the first direction to move the stone closer to the chain to accommodate wear of the stone; and
in a third mode of operation, effecting continuous movement of the stone in the second direction.

22. A method as recited in claim 21 wherein the structure for effecting linear movement of the stone includes a lever mounted exteriorly of the chain saw and rotatable about a given axis of rotation; and wherein
said first mode step is accomplished by rotating the lever about its axis from an initial position initially in a first direction, the lever returning to the initial position; and wherein the second mode of operation is accomplished by first moving the lever linearly along its axis of rotation and then initially rotating it from its initial position in a second direction of rotation, opposite the first direction of rotation; and wherein said third mode of operation is practiced without rotation or reciprocation of the lever.

* * * * *